Figure 1:
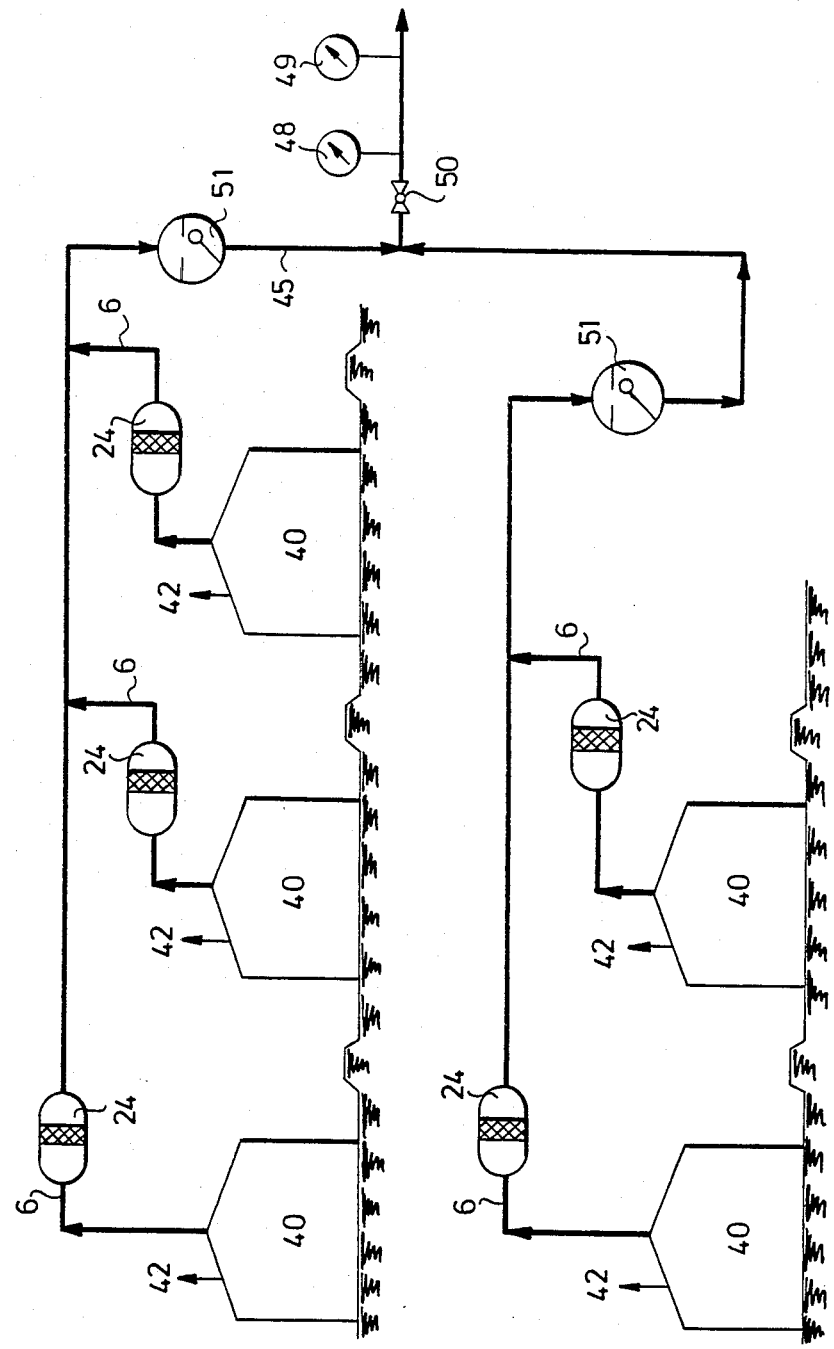

United States Patent [19]

Kostyál et al.

[11] Patent Number: 4,821,524

[45] Date of Patent: Apr. 18, 1989

[54] METHOD AND APPARATUS FOR REDUCING EVAPORATION OF STORAGE TANKS

[75] Inventors: Ferenc Kostyál; György B. Mika, Both of Budapest; Miklós Petruska; István Sokorai, Százhalombatta, all of Hungary

[73] Assignee: Olajipari Fővállalkozó és Tervező Vállalat, Budapest, Hungary

[21] Appl. No.: 195,382

[22] Filed: May 10, 1988

Related U.S. Application Data

[63] Continuation of Ser. No. 892,025, Jul. 30, 1986, abandoned.

[30] Foreign Application Priority Data

Jul. 30, 1985 [HU] Hungary ............... 2920/85

[51] Int. Cl.$^4$ .................................................... F17C 13/00
[52] U.S. Cl. ............................................................ 62/54
[58] Field of Search .............................................. 62/45, 54

[56] References Cited

U.S. PATENT DOCUMENTS

| | | | |
|---|---|---|---|
| 2,687,618 | 8/1954 | Berestrom | 62/54 |
| 2,884,763 | 5/1959 | Faulk | 62/54 |
| 2,944,405 | 7/1960 | Basore et al. | 62/54 |
| 3,079,760 | 3/1963 | Maher | 62/54 |
| 3,266,262 | 8/1966 | Moragne | 62/54 |
| 3,309,883 | 3/1967 | Waterman | 62/45 |
| 3,319,432 | 5/1967 | Nebgen | 62/45 |
| 3,319,433 | 5/1967 | Pauliukonis et al. | 62/45 |
| 3,544,289 | 12/1970 | Berlin | 62/45 |
| 3,648,436 | 3/1972 | Schonewald et al. | 62/54 |
| 3,791,422 | 2/1974 | Johnson et al. | 62/54 |
| 4,506,513 | 3/1985 | Max | 62/55.5 |
| 4,582,121 | 4/1986 | Casey | 165/104.26 |

Primary Examiner—Ronald C. Capossele
Attorney, Agent, or Firm—Schweitzer & Cornman

[57] ABSTRACT

In the equipment for reducing evaporation losses of storage tanks containing volatile materials, the storage tanks are provided with holes for the inlet resp. outlet of the material to be stored, furtheron with breathing valves and the gas-spaces of the storage tanks (40) are joined to communicate with each other and have a common discharging means (45). In course of a process for the recovery of condensable vapors from a gas-vapors mixture and for the separation thereof the gas-vapors mixture is led from the communicating gas spaces of the storage tanks containing volatile materials into the condenser, in which condensing is performed discontinuously, if a gaugepressure prevails in the common gas spaces, and so that the gas-vapor mixture is condensed with its own condensate streaming in a counterstream, as well as by means of the heat-transferring elements with internal cooling arranged in the flow of the gas-vapor mixture, so e.g. with heat pipes, absorbing the heat of condensation continuously from the height level of gas-vapor mixture, following one another. The Condenser for the performance of the process has a lower space (7a) and an upper space (7b resp. 7c) which are separated by a wall composed of bundles of tubes (7e) and heat pipes (7d) having been provided with an inner filling are extending through the wall of the bundles of tubes (7e) in a sealed manner, and in the upper tract of the lower space (7a) a further communication hole is formed.

4 Claims, 3 Drawing Sheets

METHOD AND APPARATUS FOR REDUCING EVAPORATION OF STORAGE TANKS

This is a continuing application of U.S. Ser. No. 892,025, filed on July 30, 1986, now abandoned.

The invention relates to the utilization of the gas vapour mixture existing in the gas-space (air space /of storage tanks, so tanks, groups of tanks, tank-cars and tank-waggons for the transportation on public roads and railway, respectively, barges and sea transport etc., having been displaced therefrom in course of storing the volatile material or displaced due to rise in temperature of the environment.

By the application of our invention discharge of the mixture of gas-vapour into the outer atmosphere from the storage tanks can be eliminated, simultaneously the condensable vapour phase is restored and separated from the mixture gas-vapour, accordingly, further utilization will be enabled, as a consequence, so-called evaporation losses are reduced, simultaneously considerable contamination of the environment can be avoided.

It is well known that in the air space of tanks filled with a hydrocarbon on warm summer-days temperatures reaching 50° C. or even higher occur, which cause the intense evaporation of the hydrocarbon. So e.g. the tension of a typical premium gasoline amounts to 0.5 bar at a storing temperature of +23° C. The air gasoline vapour mixture being present in the gas space of the tank and being in contact with the gasoline consists of about 50 vol. % (70 weight-%) gasoline after having reached the state of equilibrium. Gasoline content of air gasoline mixture existing in the gas space is the larger the higher the storage temperature is.

When filling tank-cars and tank-waggons, where the hydrocarbon comes into contact with the metal wall heated by solar radiation, however, due to quick filling thermodinamic equilibrium cannot be achieved, gasoline concentration of the air gasoline mixture existing in the tank space, respectively displaced therefrom, is less than 23 vol. %, i.e. it amounts to a value about 50 mass-%, if the temperature of the premium gasoline is +23 ° C.

With tanks serving for the storage of mineral oil or mineral oil products of high tension (gasoline, aromatic hydrocarbons, petrolchemical basic materials etc./, provided with fixed roof, in course of the so-called "large breathing", i.e. when the tank having been discharged almost to the bottom is re-filled, the air gasoline vapour mixture of the aforementioned concentration used to be displaced practically from the whole tank volume.

In the American Petroleum Institute research activity has been performed for several decades in order to examine the factors influencing and determining the evaporation of fixed roof, the relating data were published in the "Bulletin" 2518. So e.g. with a tank of the volume of 30,000 $m^3$—diameter 45.7 m and height 18.2 m—havin a fixed roof, being filled 8-times averagely in a year, the measured evaporation loss amounted to 674 tons.

In tanks provided with the fixed roof and filled with a liquid, above the liquid there is a gas-space to be found. In identical tanks volume of gas-space always depends on the extent of filling. It is a well known fact that temperature of the gas-space of tanks exposed to changes in ambient temperature is following the changes of external temperature. These regular changes are well reflected in the fact, in so far as the gas-space is cooling in the night and heated in daytime. The tanks constructed for atmospheric pressure are not able to stand essential changes in pressure, accordingly, with these types of tanks it is usual to prevent formation of high and low pressure values resulting in damages of the tank by means of breathing valves.

As a consequence of the function of breathing valves, if the ambient temperature drops—generally in night- —regularly air streams into the gas space of the liquid storing tank, while, if the ambient temperature rises—in general in daytime—air gasoline vapour mixtures/the vapours of the stored material/are regularly discharged. This phenomenon is known as "small breathing" and the losses caused thereby are called breathing losses.

It is quite obvious that filling and breathing losses of the tanks result simultaneously in environmental contamination, as streaming vapours are discharged into the atmosphere.

In a modern high-output oil refinery for the storage of gasolines and petrolchemical products having a high tension at the ambient temperature storing spaces of several hundred thousands $m^3$ are built. The several millions tons of products with a high tension, leaving the refinery pro year are frequently passing several technological stages prior to becoming a final product. In the intermediary stages between the single processes semi-final products used to be stored in buffer tanks. That means practically that losses resulting from "large breathing" are multiplied, while breathing loss is always proportional with the volume of the tanks for a given refinery. (With the purpose of reduce filling and breathing losses tanks with so-called floating roofs were introduced, however, in addition to these, tanks with fixed roof are also used. The more, even today such types are built, as they are cheaper and can be manipulated more easier./

It goes without saying that filling and breathing losses occur in systems transporting and distributing hydrocarbons and petrolchemical materials, but also in producing systems.

The majority of the products of refineries or plants producing petrolchemical products are transported in tank-cars on public roads, in tank-waggons on railways or in ships. In dependence of technology of storage resp. distribution the products—so e.g. motor gasolines, special gasolines, aviation gasolines, kerosine, normal-hexane, iso-hexane, benzene, tuluol, BTX fraction, ortho-xylene etc.—are filled several times into different tanks. In the refinery the materials are charged into the transporting means through identical or nearly identical charging means —so e.g. point chargers. The particular with point-chargers controlled with railway automatic computers material kinds are most frequently changing.

Accordingly, the aim of the invention is to reduce evaporation losses of storing spaces, being of special importance in course of the recovery of the vapours of mineral oil products, in particular gasoline, or other organic materials, in general, the vapours of liquids having a high tension at ambient temperature, from air or any other gas.

Methods are known, the aim of which has been the fulfilling of the same task. Trials are known, in course of which the air-space of the tank was sucked and the air hydrocarbon mixture gap was compressed up to a pressure of 3 to 6 bars in a displacement blower, after having been cooled, a part of the hydrocarbons became liquified and could be separated. This process requires expensive equipment, compression work, inspite of these, efficiency of recovery is low, besides, compression of the explosive air/gasoline mixture involves special danger.

Another trial was directed to the absorption of the hydrocarbons, in course of which the air/gasoline mixture sucked from the air-space of the tanks was absorbed in petroleum. The disadvantage of this method lay in that in order to achieve efficient recovery a large mass of petroleum was needed, at the same time recovery became possible only with a considerable energy consumption.

Elimination of the breathing valves did not represent a satisfactory solution either, because suction of the storing space may result in buckling up, i.e. when filling up the storing space, increased pressure in the gas-space may lead to accidents.

The invention is based partly on the recognition, in so far as occuring evaporation losses can be reduced to the minimum, if at least two gas-spaces of the storage tanks staying at our disposal are formed as intercommunicating spaces. In this way, the storage tank/s) staying just under discharge is (are) sucking the gas-vapour mixture estabishing gaugepressure from the interconnected storage tank of higher pressure in the gas-space, while from the storage tank/s) under filling (loading) the liquid having been changed is pressing—as a piston—the mixture of gas and vapour into the intercommunicating gas-space/s) with a lower gas pressure, thus considerably reducing the so-called breathing and/or storing losses.

From the communicating storing spaces the gas-vapour mixture establishing the resultant gaugepressure is led away for further utilization.

The communication according to the invention ensures, automatically and without external energy input (e.g. cooling/, that the gas-vapour mixture having been displaced under the influence of storing and/or breathing should stream into the gas-space of the storing space with a less pressure in the gas-space—e.g. being just under discharge—and should not stream—through the breathing valves—directly to the atmosphere.

The conception of the invention can be realized also in such a manner that—being most advantageous, if only one storing space is staying at disposal—if the storage tank/s) is (are) connected to one or more tanks with elastic wall.

Communication between the single storing spaces—if the volatile materials contained therein are such, that mixing of the gas-spaces is permissible—can be realized by the direction interconnection of the gas spaces. From the point of view of safety technique, this connection may be realized through flame arrestors.

With a further preferred embodiment of the invention a plurality of groups communicating directly with each other are formed from the storing spaces/in these the volatile materials can be stored, the mixing of the vapours of which is permitted/, while the common pipelines leading away the vapour-gas mixture from the single groups of the storing spaces are united after having inserted structural elements enabling but an unidirectional flow, leading from the groups of storing spaces to the discharge duct, and the mixture is led in the condenser for the recovery of the vapour.

It is well known that for the recovery of the vapours of the organic substances contained in the air the most frequently process is the partial condensation. In course of partial condensing the mixture is cooled down to −30° C. by a two-stage freon cycle cooler evaporating freon at −45° C. At this temperature 70% of the gasoline of the air mixture is condensed. This efficiency is rather low, the more, the process has the disadvantageous feature, that dinamically changing cooling energy requirement can be met at high expenses only.

One form of partial condensation is the counter-current condensation, in course of which the condensate is cooled together with the gas to the final temperature. Higher efficiency can be achieved by counter-current condensation where the gas/vapour mixture to be cooled flows opposite to the condensate formed, whereby it will be heated. The type of apparatuses of counter-current condensers is the film condenser, which is a vertical shell-and-tube type, heat exchanger in the tubes of which the vapour gas mixture containing the component/s) to be condensed streams upwards, while the condensed liquid flows down at the pipewall. In the shell enclosing the pipes volatile freon or ammonia boils and the vapour of cooling agent is compressed in a usual cooling machine. This type of apparatus and process resp. is described in a publication of Pohl, K. M.: "Die Belastung der Umwelt durch von Lagerbehältern verursachte Kohlenwasserstoffemissionen." Erdöl- und Kohle, Erdgas, Ed. 27, Heft 5/1974. (Environment Pollution by Gasoline Emission from fixed Roof Tanks, Erdöl- und Kohle, Erdgas Journal paper, Vol. 27 No. 5, 1974). The greater disadvantage of this method lies in that the ice precipitating in the tiny pipes is blocking the path of flow in a short time. Increasing the diameter of the pipes does not yield the satisfactory solution, as in this way cooling surface will be less, simultaneously the surface of the liquid film flowing on the inner wall of the pipe decreases too.

To avoid said disadvantages condenser-absorbers have been developed, with which a part of the condensate is recirculated into the absorber through the evaporating cooler by means of a pump. This process separates the cooling and mass-transfer (condensing/absorbing) apparatuses. The process and the apparatus is described in the publication Mitsche, M.: "Benzinrückgewinnung beim Umschlag von Vergaserkraftstoffen. Erdöl-Kohle, Erdgas, 37(Heft 9.) September, 1984. (Gasoline recovery at filling. Erdöl-Kohle, Erdgas Journal, Vol. 37. No. 9, 1984).

On the other hand our invention is based on the recognition, in so far as recovery of the vapour phase from the mixture of gas and vapour can be advantageously realized so, —representing the essential new feature of the process and equipment according to the invention—if material transfer and heat transfer are united, that means, that a condenser with internal cooling is realized in which the gas-vapour mixture containing the condensable components is flowing in a counter flow with its own condensate, it stays in contact therewith, condenses, in addition to it, on every height level it contacts the cooling surfaces arranged in its flow.

With this process we found the solution of the simultaneous heat and material transport, as condensation resp. absorption heat, being released in course of phase change, are immediately and just on this place led away, as it is described in the principle of transport processes for the ideal case. (see: Szocsányi, P.: Transport processes. Educational Publishers, Budapest, 1972).

Based on said recognitions, the object of our invention is partly a method for reducing the evaporation losses of storage tanks containing volatile materials by the recovery of condensable vapour from the gas-vapour mixture, and by the separation thereof, in course of which the gas-vapour mixture is led from the storage tanks —periodically, when gangepressure prevails—into the condenser, where it is condensed by using a volatile and/or sublimating cooling medium. In the condenser the gas-vapour mixture is condensed with its own condensate flowing in the opposite direction, furtheron, on each height level of the gas-vapour stream heat is absorbed by using an internal cooling, having been arranged in the gas-vapour flow.

In course of the process according to the invention energy requirement can be reduced to the minimum so, that the materials partaking in the condensing process resp. formed in course thereof, so the vapour of the volatile and/or sublimating cooling medium and/or the cleaned gas and/or the separated condensate of the gas-vapour mixture are led back with the gas-vapour mixture in counterstream, thus pre-cooling the gas-vapour mixture, resp. performing a partial condensation.

Considering that in course of the process according to the invention condensation is performed only periodically, if gaugepressure prevails in the common gas space of the storage tanks containing volatile materials, with a preferred mode of realization of the process according to the invention in said intervals we close the communication between the condensing apparatus and the gas-spaces of the storage tanks. We heat periodically the condenser, melting ice crystals and other crystals like paraffin, benzene formed in course of condensation. The melting hot flow can stream in the same direction, as the gas-vapour mixture to be cleaned by the condensation process.

With further preferred mode of realization of the process according to the invention condensation efficiency can be changed within wide limits by adjustment cooling medium pressure and/or of the flooding level of the cooling surface, in compliance with the volatile material and the quantity thereof.

Furtheron, the invention relates also to the condenser being suitable for realizing the process according to the invention, a condenser with internal cooling, that is, by the aid of which it can be ensured that the gas-vapour mixture could be condensed with its own condensate flowing in a counterflow, simultaneously from every single surfacial level of the gas-vapour flow heat is dissipated by the heat transfer elements are arranged in the gas-vapour flow.

The condenser with the internal cooling according to the invention consists of two spaces separated by a partition wall, out of which in the upper space—in the storing and evaporating space—the cooling medium evaporates and/or sublimates. In the lower space, being separated from the upper space expediently with a wall of a bundle of tubes, the gas-vapour mixture introduced thereto is cooled, in which—under the influence of cooling—partial condensation is taking place. Intense heat transport between the upper space and the lower space is ensured by the heat pipes extending from the upper space into the lower space through the tube wall plate and being provided with the proper filling. Said heat pipes, resp. a part thereof, are formed in the condenser according to the invention as a capillary, e.g. provided with an internal wick. Heat pipes are surrounded by structural elements rendering material and heat transfer efficient, so e.g. discs with valve cap, discs with tilting element. The upper space of the condenser is provided with inlet and outlet openings for the medium(media) to be stored, and the cooling and heating media, respectively.

The bottom of the lower part, the sump is constructed for gathering the condensate. In the upper tract of the lower space in the air-space a hole is formed, to which a pipeline can be connected leading away the leaving cleaned gas. The lower space has further two outlet holes for introducing the gasvapour mixture and withdrawal the condensate.

With a preferred embodiment of the invention in the condenser the number of the heat pipes increases in the lower part, as advancing from the bottom upwards.

With a further preferred embodiment of the invention the cross-section of the condenser (the lower space thereof) is narrowing from the bottom upwards.

In the lower space and in the upper space level-indicators are arranged and advantageously in the upper space a manometer is arranged.

The condenser according to the invention is well suitable for condensing a gas-vapour mixture, in this case a cooling medium is to be introduced into the upper space, while the gas-vapour mixture is introduced into the lower space, the upward stream of which can be assured by the fan connected to the upper outlet hole of the lower space.

Furtheron, the condenser according to the invention can be used for melting the materials having been crystallized in course of condensation, in this case a heating medium is to be led into the upper space of the condenser and by utilizing the intense heat transfer properties of the heat pipes, the crystals are melt by internal heating.

Figure 2:
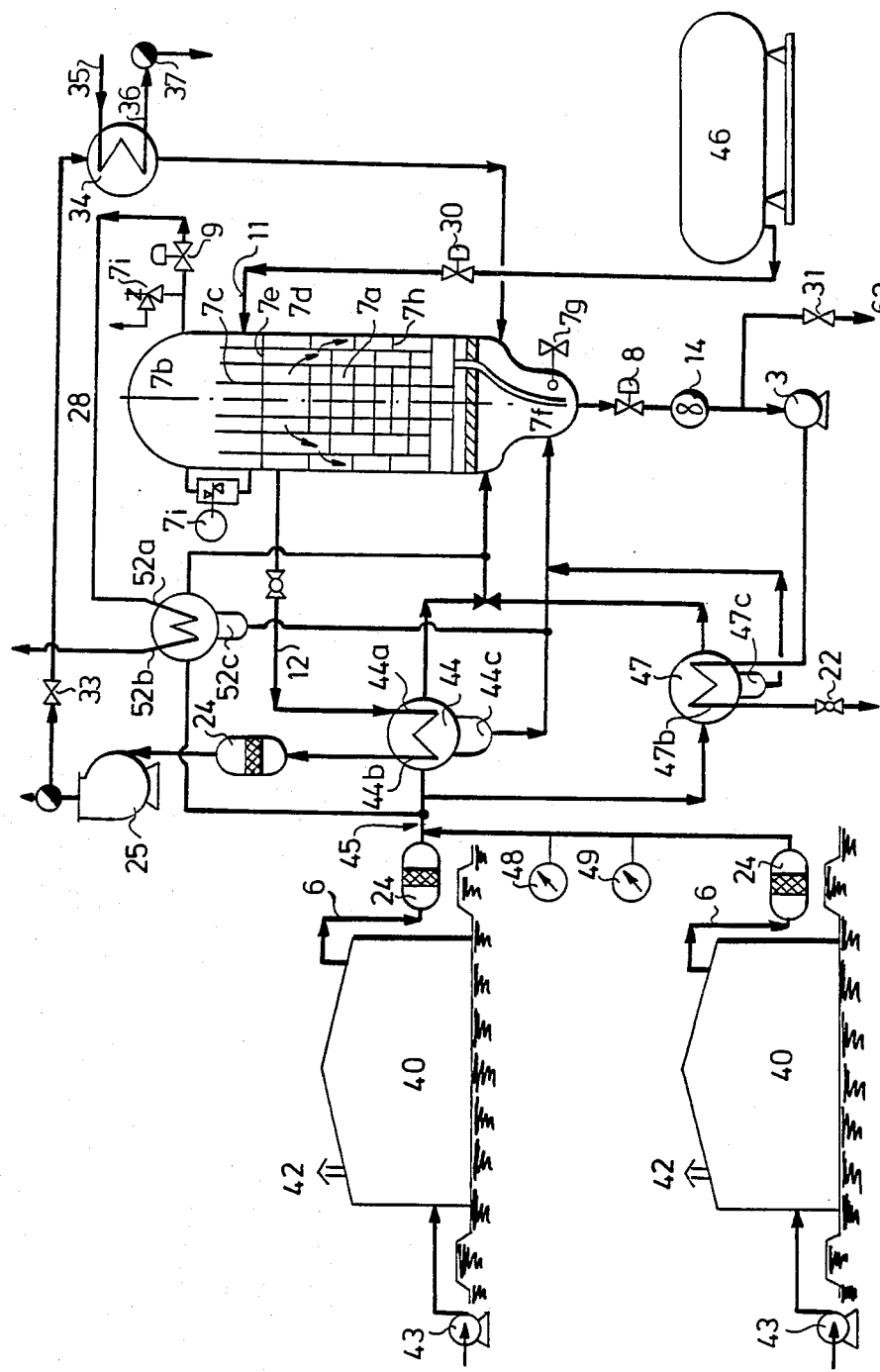
Figure 3:
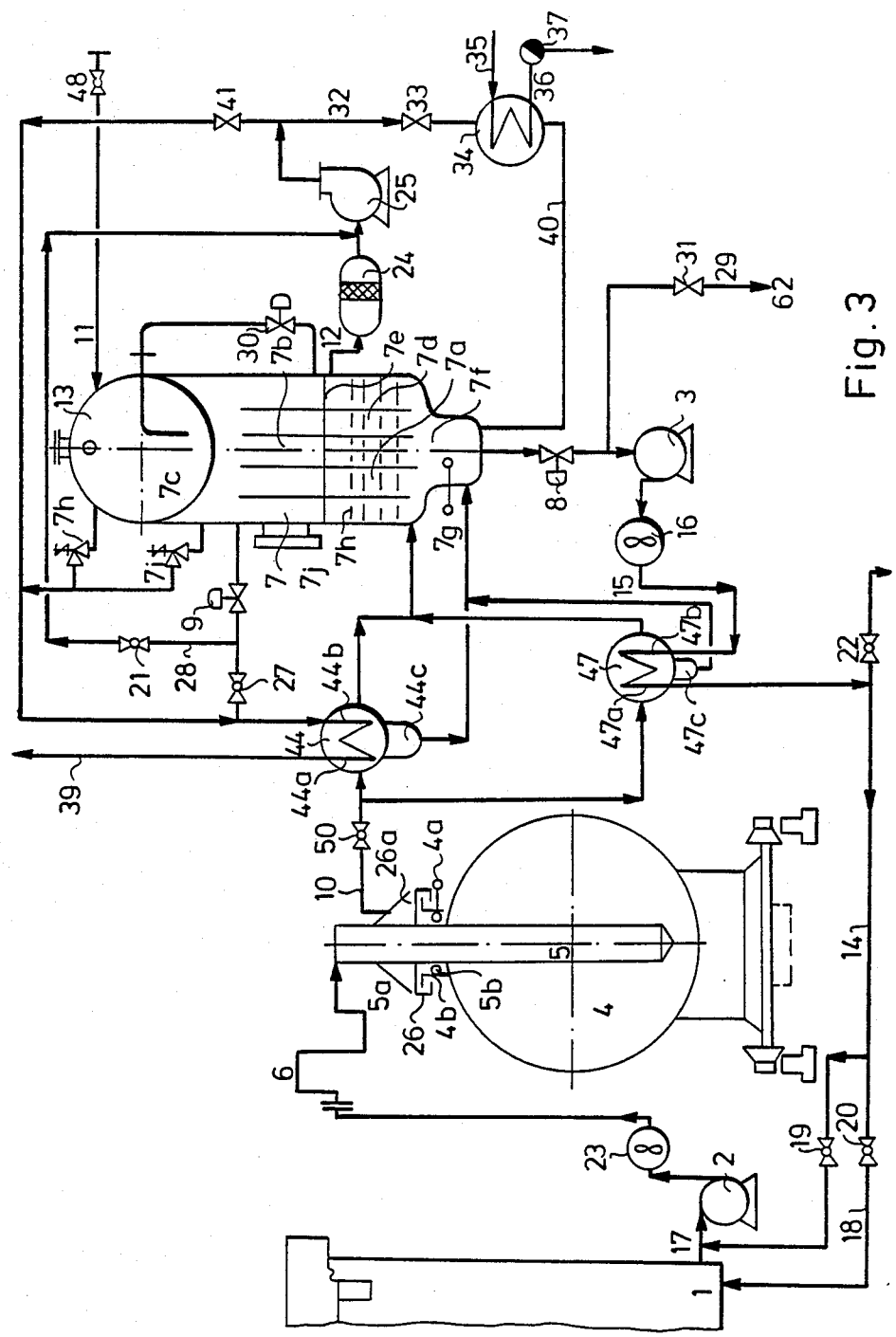

The invention will be described in detail by the aid of preferred embodiments serving as example, by the way of the drawings enclosed, wherein:

FIG. 1 shows the equipment according to the invention having storage tanks containing volatile materials which must not be mixed, FIG. 2 gives an example of realizing the process according to the invention by using a condenser according to the invention, in case of fixed tanks, and FIG. 3 gives an example for the condensing process according to the invention and for the application of the condenser with a pointcharger filling hydrocarbons, as usual for railway transport.

FIG. 1 shows a storage tank group comprising tanks 40. For the purpose of safety technics all the tanks 40 are provided with breathing valves 42 known in itselves. Communication of the tanks 40 is realized by means of pipelines 6, expediently through flame arrestors 24. In case of the example shown in FIG. 1 in the storing tanks 40 arranged in an upper row identical products are stored, but in the lower tank row a product is stored, which is different from those in the upper tanks 40.

In case, if any of the interconnected tanks 40 is discharged, the pressure drops in the air space thereof, accordingly a suction effect is exerted onto the other gas-spaces of the tanks 40 being just under charging. As a result, filling losses of the latter one decreases, as the vapour contained therein is transferred into the tank 40 just discharged. In the pipeline 6 interconnecting the tanks 40 check-valves 51 with low resistance are arranged and so, that the tanks 40 storing different materials (the gas-spaces of the two tank rows) could not communicate with each other, as they allow only an unidirectional flow, at our example a flow from the tanks 40 to a collecting header 45 applied as a common outlet pipe. The collecting headers 45 of the two tank groups are connected via ball cock 50 to the pipeline discharging the gas-vapour mixture leaving under the influence of resultant gaugepressure and a vacuum-operated switch 49 and a pressure-operated switch 48 are inserted in said pipeline. Expediently this pipeline is connected to a condenser 7 according to the invention, as described later.

This solution is applied e.g. with a tank-group containing aromatic products. Probability of simultaneity of charging and discharging of tanks with fixed roof, staying at disposal at a larger number—6 to 10 pieces—is already so high, respectively, e.g. in a refinery the proportion of the taken volume to the charged volume is of such a considerable extent, that with the storage tanks with gas-spaces thus communicating with each other the material quantity having been sucked with the "semi-communicating vessels" thus formed and saved (not egressing into the air space) is most significant.

FIG. 2 illustrates an arrangement, serving as an example for the method and apparatus according to the invention.

In the figure two tanks 40 are to be seen, containing in this case materials which can be mixed. On the tanks 40 breathing valves 42 are arranged, which are suction-pressure valves. The suction valve hinders getting dented of the tank 40 (the usual setting value amounts to e.g. −500 Pa in relation to atmospheric pressure), while by setting the pressure valve to the proper value (e.g. +500 Pa) it can be prevented that the internal gaugepressure should burst the tank.

A charging pump 43 is connected to the tanks 40 and they are provided with the pipelines 6, which are connected to the collecting header 45 via the flame arresters 24. The pressure-operated switch 48 and the vacuum-operated switch 49 are inserted into the collecting header 45. In course of discharging one of the tanks 40 the suction effect arising forwards the gasvapour mixture through the pipeline 6 and through the flame arrestor 24 from the combustion space of the other tank 40 to the gas-space of the first tank 40, and only the gas-vapour mixture coming from the resultant gaugepressure arrives at the condenser through the collecting header 45.

If any of the tanks 40 are filled, the liquid charged-in displaces the gas-vapour mixture lying above, actuating as a piston, the mixture thus displaced arrives also at the collecting header 45. A similar phenomenon can be observed, when the tanks 40 are heated and the pressure increases under the influence of heat in the gas-space of the tanks 40. In such a manner, by means of the arrangement according to the invention it can be assured that in the commoned storing spaces only the gas-vapour mixture from the resultant gaugepressure represents the evaporation loss, which will then utilized in a condenser having been formed expediently in accordance with the invention, wherein the vapour phase is condensed and the condensate is led away.

With the arrangement according to FIG. 2 the collecting header 45 is connected to pre-coolers 44, 52 and 47, out of which the pre-cooler 47 is a gas-liquid heatexhanger. In the pre-coolers 44, 52 and 47 the gasvapour mixture is pre-cooled and thus condensed to a certain extent. The pre-cooled gas-vapour mixture travels through tubular spaces 44 a, 52a and 47a to an air-space 7a of the internally cooled condenser 7 having been constructed in accordance with the invention.

Sumps 44c, 52c and 47c of the pre-coolers 44, 52, 47 are connected to the sump 7c of the internally cooled condenser 7 and are arranged lying higher, than the sump 7c, accordingly, the condensate accumulated therein arrives with an inclination to the sump 7c.

The tubular space of the pre-cooler 44 is connected via air-duct 12 to the air-space 7a of the internally cooled condenser 7, whereby in the pre-cooler 44 pre-cooling is performed by the cleaned gas-vapour mixture. From the tubular space 44a of the pre-cooler 44 the cleaned gas-vapour mixture enters into the air-space through the flame arrester 24 and fan 25.

The tubular space 52a of the pre-cooler 52 is connected via pipeline 28 to evaporating space 76 of the internally cooled condenser 7, accordingly, pre-cooling of the gas-vapour mixture is performed by the vapours of the cooling medium of the condenser 7 in the pre-cooler 52.

Tubular space 47a of the pre-cooler 47 is connected to the sump 7f of the condenser 7 via circulating pump 3 and a line 14 to the sump 7f of the condenser 7, in which the condensed vapour is accumulated and from which the condensate is led away for further utilization. A level-control valve 8, a ball cock 22 and a needle valve 31 are inserted into the line 14.

With the arrangement according to the example the cooling medium is stored separately in a coolant tank 46, which is connected through a filling duct 11 to the storing space 7c of the condenser 7. A regulating valve 30 is inserted into the filling duct 11, the function of which is regulated by liquid level indicator 76 arranged in the storing space 7c of the condenser 7. Storing space 7c and evaporating space 7b, respectively, are protected against gaugepressure by the safety valve 78 inserted into the pipeline 28.

An air-duct of a calorifer 34 is connected periodically to the sump 7f of the condenser 7. The calorifer 34 includes a vapour duct 35, and the calorifer 34 is heated with the vapour streaming therein. The waste water is discharged through drain pipe 36 and condense vessel 37. The air-duct of the calorifer 34 is connected via bypass duct 32 and butterfly-valve 33 inserted therein into the pressure pipe of the fan 25.

The arrangement according to FIG. 2 operates as follows: As soon as in the collecting header 45 due to the aforedetailed circumstances gaugepressure is built-up, the inserted pressure-operated switch 48—i.e. a contactmanometer or a contact producing draft indicator—turns on the fan 25. (Switching value of the pressure-operated switch 48 is to be set to a lower value, than the limit value set on the pressure valve of the breathing valve 42, so e.g. to +400 Pa). Simultaneously with starting the fan 25 the pressure-operated switch 48 opens the regulating valve 30, as a consequence, the cooling medium flows from the coolant tank 46 through the filling duct 11 to the upper cooling space of the internally cooled condenser 7, into the storing space 7c, where it begins to evaporate. The regulating valve 30 allows to flow the cooling medium into the storing space 7c up to the adjusted value, thereafter the cooling medium evaporates in the heat pipes interconnecting the upper space of the internally cooled condenser 7, the evaporating space 7b and the lower space, and the air-space 7a and under the effect of differential density it rises (by free convection) inside of the pipe. (Lower and upper space of the condenser 7 are separated by the wall 7e formed by a bundle of tubes).

In course of the process according to the invention as a coolant a cooling medium stored in the coolant tank 46, boiling at a low temperature is used, so e.g. liquid or solid carbon dioxide which is either evaporated or sublimated, however, as a coolant liquid propane, propene, ethane, ethene, freon or any other cooling medium can be used, by the aid of which final cooling temperature of the gas-vapour mixture can be assured within a rather wide temperature range, between 0° C. and −60 ° C. This can be achieved in two ways:

The temperature of the evaporating resp. sublimating cooling medium is controlled by settiung the pressure prevailing in the vapour space lying above.

Cooling capacity is regulated by the extent of flooding (increasing evaporation resp. level of the sublimating cooling medium and thus increasing cooling capacity).

In case of our example pressure of the evaporating space 7b is achieved in a way known in itself, by the proper setting of the regulating valve 9, while extent of flooding of the heating pipes 7d is controlled by setting the level control valve 30 by the aid of the level indicator 7j (by value-maintaining control).

By these solution it becomes possible to be always in compliance with the prevailing gas-vapour yield within wide limits, resp. with the medium to be condensed, simultaneously output of the condenser 7 can be controlled too.

In case of the example described here, a plurality of heat pipes 7d extend into the air-space 7a, in the inside of which evaporation of the cooling medium is taking place. Material and heat transfer are promoted by means of efficient disc structures, so e.g. discs with valve caps, discs provided with a tilting element or discs made of an expanded sheet, said discs are arranged in the air-space 7a of the condenser 7, the heat pipe 7d is crossing said discs.

With a preferred embodiment of the internally cooled condenser 7 the heat pipes 7d of different length extending into the air-space 7a in such a manner that—as it is to be seen in FIG. 2—the single rows of heat pipes 7d are exending ever farther and farther into the discs arranged on the lower levels, as a consequence closeness of the heat pipes, i.e. the number of the heat pipes 7d increases, when advancing from the bottom upwards.

In the switched-on state the fan 25 allows to circulate the gas-vapour mixture on the discs of the condenser 7, from the bottom upwards; the gas-vapour mixture gets condensed in the heat pipes 7d under the effect of the evaporating coolant and forming a cold liquid flow streaming on the discs downward from the top which is collected in the sump 7f. Above the uppermost disc of the air space 7a expediently dephlegmator pipes are arranged which guarantee final cooling. The air duct 12 is connected also to this part of the space, through which—under the suction effect of the fan 25—the cleaned gas-vapour mixture arrives at the tubular space 44a of the pre-cooler 44 and pre-cools—and partly condenses—the gas-vapour mixture.

As soon as the gaugepressure in the collecting header 45 exceeds the pre-set value, the fan 25 begins to operate it sucks the pre-cooled gas-vapour mixture through the air-space 7a of the condenser 7, and the mixture—when brought into contact with its own condensate flowing in the opposite direction (downwards from the top) i.e. under the cooling effect transferred through the walls of the heat pipes 7d, ensured by the continuous flow of the medium flowing downwards on the inner wall of the heat pipes 7d, gets condensed.

Accordingly, said arrangement guarantees the realization of the essential main characteristic of the process according to the invention, i.e. that cooling and condensation of the gas-vapour mixture could be realized continuously and in an energy saving manner in full length, by the aid of the heat transfer elements arranged in said gas-vapour mixture.

The condensate accumulated in the sump 7 is utilized fully or partly for pre-cooling the gas-vapour mixture by leading it through—by actuating the pump 3—the tubular space 47a of the pre-cooler 47 and then collected for further use. Condensation process lasts as long as the gas-vapour mixture in the collecting header 45 is reaching the pre-set lowest pressure value, thereafter the inserted vacuum-operated switch 49 stops the process by turning off the tan 25, resp. by simultaneously closing the control valve 30 of the coolant storage tank 46.

(Pressure limit value of the vacuum-operated switch 49 is to be set to a higher value, than the set limit value of the breathing valve 42, e.g. to the valve of −400 Pa).

The gas-vapour mixture may contain water-steam or any other material tending to crystallization when cooled, so e.g. paraffine. Icing, resp. crystallization occuring decelerates partly heat transfer (in an extreme case it may be even stopped), partly one of the task set to our invention is to separate the condensate, taking place by melting and discharge.

The process according to the invention resp. the condenser 7 are well suitable fort the recovery of crystallized products, to achieve this, the calorifer 34 is connected to the condensator 7 with the internal thermal space.

Actuation thereof is expediently taking place in the dead intervals between charging the single storage tanks 40, so e.g. in night. In this case simultaneously with closing the control valve 30 the level-control valve 8 and the ball cock 22 are opened, the condensate is fully discharged from the sump 7f.

By opening the butterfly valve 33 in the by-pass duct 32 of the pressure-line of the fan 25 air is led through the calorifer 34, the air heated therein is led into the sump 7f, which when passing through the heat pipes 7 melts the ice precipitated on the walls, resp. the crystals formed. Melt materials (so e.g. sewage) accumulated in the sump 7f will be drained by opening the needle valve 31.

The process and apparatus as shown in FIG. 3 give an example for further use, with point-charger hydrocarbons for railway transport. Charging of tank 4 is performed from tank 1, by means of a charging pump 2, through the telescopic pipeline 6. The pipeline 6 includes flow meter 23 for measuring the volumetric flow of the liquid product. The telescopic pipeline 6 is connected to charging pipe 5, which is extended into the tank 4 through elastic texture 26a of a lid 26 having been placed on the flange of a manhole 46 of the tank 4. On the charging pipe 5 there is an inflatable packing ring 5b, pressing against the flange of the manhole 46, thus closing the tank 4. Above the charging pipe 5 thre is a screen 5a arranged which guides the gas-vapour mixture rising from the tank 4 through the texture 26a while a drain pipe 10 is connected to the screen 5a. The drain pipe 10 is connected via the ball cock 50 to the condenser according to the invention to the pre-coolers 44 and 47. The pre-cooler 47 has the similar layout as shown in FIG. 2, having a gasliquid heat exchanger, while the cooling medium is formed by the condensate accumulated in the sump 7c of the internally cooled condensate 7, which is pressed by the pump 3 through the tubular space 47b, which is—with the embodiment described here—led back through the pipeline 14 and the ball cock 20 inserted into the pipeline 14 partly to the charging tank 1, partly through the ball cock 19 to the suction pipe 17 of the pump 2 for further utilization.

Tubular space 44a of the pre-cooler 44 communicates with the evaporating space 76 of the internally cooled condenser 7 and the air-space 7a through the pipelines and the closing, regulating resp. safety—technical elements.

The sumps 44c resp. 47c of the pre-coolers 44 and 47 are connected to the sump 7c of the condenser 7 with a proper inclination, as a consequence, the condensate accumulated therein is flowing into the sump 7c. From the shell-space 44b resp. 47b of the pre-coolers 44 resp. 47 the pre-cooled gas-vapour mixture arrives at the air-space 7a of the condenser 7, the principle structural layout of which corresponds to that according to FIG. 2, mode of construction differs in dependence of storage of the coolant.

Storing space 7c of the condenser 7, which is charged through the connected flexible pipeline 11 from the tankcar of the cooling plant with the cooling medium, is arranged on the top of the condenser 7 and communicates via the pipeline with the evaporating space 7b lying beneath.

The evaporating space 7 is separated from the air-space 7a of the condenser 7 and a plurality of heat pipes 7d are extending from the evaporating space 7b into the air-space 7a, in the inside of which the coolant evaporates and under the influence of differential density (free convection) it rises in the inside of the heat pipe 7d. The heat pipes 7d are separated by the wall formed by bundles of tubes.

The heat pipes 7d arranged in the wall of bundles of tubes 7e assure a high thermal flux density, as transport of thermal energy is taking place mostly by phase changes and convection and not conduction. The colling medium evaporating resp. sublimating in the evaporating space 7b condenses the vapour of the filling substance rising in the inside of the heat pipes 7d, the condensate of which is streaming downwards on the inner wall of the heat pipes 7d under the influence of gravity.

In the storing space 7c a level indicator 13 is arranged, with which overfilling of the storing space 7c can be avoided so, that after having reached the desired level, the ball cock 30 of the pipeline 11 is closed.

Storing space 7c is protected against gauge-pressure by the safety valve 7h, while safety valve 7i protects the evaporation space 7b, by leading the blown vapour into a blower 38. Air space 7a of the condenser 7 is connected via the air-duct 12 and the flame arrester 24 to the fan 25, which is forcing the introduced gas-vapour mixture in the air-space 7a to an upwards stream, furtheron it presses the cleaned gas into a chimney 39 through the tubular space 44b of the pre-cooler 44.

In case of the example described here, the vapour framed in the evaporating space 7b in course of evaporation of the cooling medium is led into the tubular space 44b. In order to eliminate icing resp. to metal crystallized materials, the calorifier 34 is connected to the internally cooled condenser 7, which is heated by the calorifer 34 with the vapour streaming in through the steam-line 35, while the air thus heated or any other heating medium is led through the by-pass line 32, with the circulating fan 25 e.g. into the evaporating space 7b of the condenser 7 or to the air-space 7a thereof. The heating medium streaming through the heat pipes 7d resp. the spaces connected metals by heat transfer the ice precipitated on the outerwalls of the heat pipes 7d and the tubular spaces 44a and 47a of the pre-coolers 44 and 47, resp. other crystallized substances sedimented from the gas-vapour mixture.

Operation of the equipment, condensation of the gas-vapour mixture, melting of icing and/or crystallized materials in the intervals between condensing are taking place, as described in connection with FIG. 2.

If the tank 4 is filled with different inmiscible materials or switching over to another product, the ball cocks 19 and 20 are closed, the condensate accumulated in the sump 7f of the condenser 7 is led to the line 62 by opening the needle valve 31. One proceeds so, e.g. if after having charged motor gasoline benzol is to be charged into the tank. (On the contrary, if we switch-over from charging benzol to charging gasoline, it can be left in the sump 7f resp. led back to the charging tank 1 through the pipeline 14).

It goes without saying that the process and equipment according to the invention can be applied not only in case of the examples here described, but in all cases, in which volatile materials are stored and the material losses resulting from evaporation resp. unpermissible contamination of the environment make economical resp. necessitate reduction of evaporation losses, i.e. utilization and recovery from the gas-vapour mixture.

What we claim is:

1. Apparatus for the recovery of a volatile liquid from a gaseous phase without any mechanical compression or suction, which comprises a plurality of tanks each having a vapour outlet at or near its top, some or all of said tanks containing a volatile liquid, each of said tanks having a breathing valve for admitting gas from the exterior of said tank when the pressure within a tank falls below the pressure of said gas, a header tube connecting parallel to each other the vapor outlets of a plurality of tanks for recovering mixture of vapors of said volatile liquid and the gas in the space in a tank above the volatile liquid and for continuously conveying away said mixture from each tank in which the pressure of said liquid is greater than in said header tube, said greater pressure in a tank being due to the introduction of additional volatile liquid into a tank, or an increase of the temperature therein, or both, a countercurrent flow condenser connected from said header tube for condensing and recovering volatile liquid from gases introduced from a tank into the header tube, and means for preventing volatile liquid condensed within said condenser from reentering said header tube.

2. The apparatus of claim, further comprising a plurality of flame arresters each disposed between the vapor outlet of a storage tank and said header tube connected thereto.

3. The apparatus of claim 1, wherein at least one of said tanks is empty and has an elastic wall.

4. The apparatus of claim 1, wherein said means for preventing volatile liquid from reentering comprises a check valve.

* * * * *